US011010599B2

(12) United States Patent
Gefen et al.

(10) Patent No.: US 11,010,599 B2
(45) Date of Patent: May 18, 2021

(54) FACIAL RECOGNITION FOR MULTI-STREAM VIDEO USING HIGH PROBABILITY GROUP AND FACIAL NETWORK OF RELATED PERSONS

(71) Applicant: EMC IP Holding Company LLC, Hopkinton, MA (US)

(72) Inventors: Avitan Gefen, Tel Aviv (IL); Amihai Savir, Sansana (IL); Omer Sagi, Mazkeret Batya (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 128 days.

(21) Appl. No.: 16/400,303

(22) Filed: May 1, 2019

(65) Prior Publication Data
US 2020/0349346 A1 Nov. 5, 2020

(51) Int. Cl.
*G06K 9/00* (2006.01)
*G06F 16/55* (2019.01)

(52) U.S. Cl.
CPC ......... *G06K 9/00295* (2013.01); *G06F 16/55* (2019.01); *G06K 9/00228* (2013.01); *G06K 9/00718* (2013.01)

(58) Field of Classification Search
CPC combination set(s) only.
See application file for complete search history.

(56) References Cited

U.S. PATENT DOCUMENTS

| 8,364,646 B2 | 1/2013 | Hanna et al. |
| 2003/0084065 A1 | 5/2003 | Lin et al. |
| 2008/0260257 A1 | 10/2008 | Rose |
| 2009/0074258 A1 | 3/2009 | Cotgreave |
| 2010/0149305 A1 | 6/2010 | Catchpole et al. |
| 2011/0129126 A1* | 6/2011 | Begeja ............... G06F 16/784 382/118 |
| 2015/0279116 A1 | 10/2015 | Yachida |

(Continued)

OTHER PUBLICATIONS

U.S. Patent Application filed concurrently entitled, "Facial Recognition for Multi-Stream Video Using High Probability Group."

(Continued)

*Primary Examiner* — Iman K Kholdebarin
(74) *Attorney, Agent, or Firm* — Ryan, Mason & Lewis, LLP

(57) ABSTRACT

Techniques are provided for facial recognition using a high probability group database and a facial network of related persons. One method comprises maintaining a probability-based database of facial images comprising a subset of individuals from a first database of facial images of a plurality of individuals based on a probability of individuals appearing in sequences of image frames at a given time; applying a face detection algorithm to at least one sequence of image frames to identify one or more faces in the sequences of image frames; maintaining a facial network of related persons associated with the probability-based database by obtaining facial images of one or more additional individuals from the first database that satisfy a predefined related person criteria with respect to individuals identified in at least one sequence of image frames; and applying a facial recognition to at least one sequence of image frames using at least the probability-based database and the facial network of related persons to identify individuals in the sequence of image frames.

20 Claims, 6 Drawing Sheets

(56) References Cited

U.S. PATENT DOCUMENTS

| | | | |
|---|---|---|---|
| 2015/0294159 A1* | 10/2015 | Takahashi | G08B 13/19645 |
| | | | 382/103 |
| 2015/0355613 A1 | 12/2015 | Palmer | |
| 2016/0132722 A1* | 5/2016 | Yarp | H04N 5/247 |
| | | | 348/159 |
| 2016/0191434 A1 | 6/2016 | Rice | |
| 2018/0204093 A1* | 7/2018 | Zhu | G06K 9/6218 |
| 2020/0234036 A1 | 7/2020 | Yu et al. | |

* cited by examiner

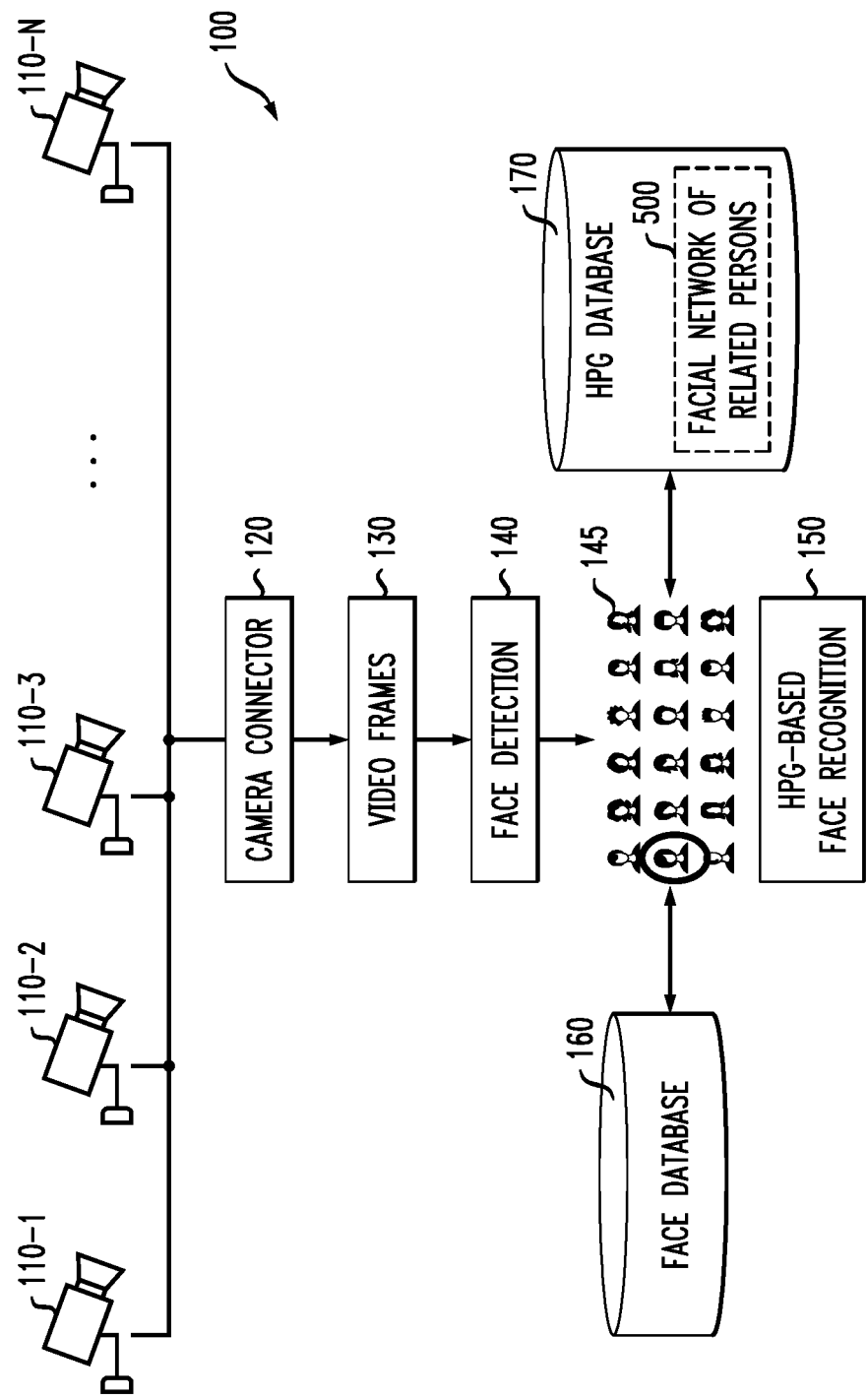

FIG. 2

```
FOR EACH NEW IMAGE FRAME, PERFORM FOLLOWING STEPS:

IF NEW FACIAL IMAGE BELONGS TO AN ALREADY TRACKED FACE, ASSIGN NEW FACIAL
IMAGE TO TRACKED FACE;

IF NEW FACIAL IMAGE IS NOT TRACKED, CHECK AGAINST FACES ALREADY FOUND IN
HPG DATABASE 170, IF NEW FACIAL IMAGE IS CLOSE ENOUGH TO AN HPG FACE,
THEN ASSIGN NEW FACIAL IMAGE TO HPG FACE AND START TRACKING;

IF NEW FACIAL IMAGE IS NOT CLOSE ENOUGH TO ANY FACE FOUND IN THE HPG
DATABASE 170, GENERATE A NEW FACE IDENTIFIER, START TRACKING NEW FACE,
AND ADD NEW FACE IDENTIFIER TO HPG DATABASE 170;

COLLECT IMAGES OF THE SAME PERSON FROM MULTIPLE VIDEO APPEARANCES TO
REDUCE ERROR RATES BY HAVING MORE EXAMPLES OF FACE OF PERSON;

COLLECT SUFFICIENT NUMBER OF IMAGES OF FACE OF A NEW IDENTIFIER IN HPG
DATABASE 170 AND THEN MATCH PERSON TO FACE DATABASE 160 OF KNOWN
FACES TO OBTAIN NAME (AND/OR STATUS, SUCH AS EMPLOYEE/NOT EMPLOYEE)
(THIS OPERATION IS OPTIONALLY CONDUCTED IN PARALLEL WITH FACE DETECTION AND
HPG MATCHING); AND

OPTIONALLY, IMPORT PERSONS RELATED TO TRACKED FACE INTO FACIAL NETWORK OF
RELATED PERSONS 500 WITHIN HPG DATABASE 170 FROM FACE DATABASE 160.
```

FACIAL NETWORK OF RELATED PERSONS
500

FOR EACH PERSON IN THE HPG DATABASE 170, EVALUATE ITS TIME SERIES OF APPEARANCE TIMESTAMPS AND CLUSTER APPEARANCE TIMESTAMPS INTO SCENES (THE OUTPUT IS A TIME SERIES OF SCENES WHERE EACH SCENE IS A TIME INTERVAL WITH MINIMUM AND MAXIMUM);

EVALUATE ALL FACES IN THE HPG DATABASE 170, FOR EACH TWO FACES, $f_1$ AND $f_2$, GO OVER ALL SCENES OF $f_1$ AND FIND THE CLOSEST SCENE IN TO SCENES OF $f_2$. IF THE SCENES OVERLAP, THEN THE DIFFERENCE IS ZERO. IF THERE ARE ENOUGH OVERLAPPING SCENES (e.g., BASED ON A PREDEFINED OR CONFIGURED THRESHOLD THAT CAN BE FOUND AND OPTIMIZED EMPIRICALLY) OR ENOUGH SCENES WITH A SMALL-TIME DIFFERENCE (e.g., BASED ON A PREDEFINED OR CONFIGURED THRESHOLD THAT CAN BE FOUND AND OPTIMIZED EMPIRICALLY), THEN CONNECT NODES OF THE TWO FACES, $f_1$ AND $f_2$, WITH AN EDGE; AND

FOR EACH EDGE, OBTAIN A WEIGHT FOR THE NUMBER OF TIMES THE PERSONS WERE SEEN IN IMAGES THAT ARE CLOSE IN TIME OR TOGETHER. FOR EACH NEW COMPUTATION OF THE NETWORK 500, THE OLD WEIGHT WILL BE DEGRADED BY A FACTOR SO THAT CONNECTIONS THAT ARE NOT VALID ANY MORE WILL BE REMOVED OVER TIME.

FACIAL RECOGNITION FOR MULTI-STREAM VIDEO USING HIGH PROBABILITY GROUP AND FACIAL NETWORK OF RELATED PERSONS

CROSS-REFERENCE TO RELATED APPLICATION(S)

The present application is related to U.S. patent application Ser. No. 16/400,293, filed contemporaneously herewith, entitled "Facial Recognition for Multi-Stream Video using High Probability Group," incorporated by reference herein in its entirety.

FIELD

The field relates generally to facial recognition techniques.

BACKGROUND

Facial recognition systems are used to identify or verify an identity of a person from images (including sequences of video frames) by comparing facial features with faces within a database. Facial recognition technology is often used for security, entertainment and archival tagging. New deep learning techniques in face detection facilitate recognition of a very large number of people, by mapping faces (in images) into a high dimensional Euclidean space. Each face is transformed into a feature vector which allows for a similarity comparison by calculating a distance between a face from a given image and other faces acquired from previous images. This database of faces can be very large. Thus, the size of the database may create a bottleneck when trying to recognize individuals at the edge of the Internet, for example, in real-time due to computational needs and/or connectivity latency with the cloud.

A need therefore exists for improved techniques for facial recognition.

SUMMARY

In one embodiment, a method comprises maintaining a probability-based database of facial images comprising a subset of individuals from a first database of facial images of a plurality of individuals, wherein the subset is obtained based on a probability of individuals appearing in one or more sequences of image frames at a given time; applying a face detection algorithm to at least one of the sequences of image frames to identify one or more faces in the one or more sequences of image frames; maintaining a facial network of related persons associated with the probability-based database by obtaining one or more facial images of one or more additional individuals from the first database of images that satisfy a predefined related person criteria with respect to one or more individuals identified in at least one of the sequences of image frames; and applying a facial recognition to at least one of the sequences of image frames using at least the probability-based database and the facial network of related persons to identify one or more individuals in the at least one sequence of image frames.

In some embodiments, the step of maintaining the facial network of related persons further comprises the step of obtaining the one or more facial images of the one or more additional individuals from the first database of images based on one or more specified network size criteria. The specified network size criteria comprises, for example, a number of edges, a community name and/or a maximum network size.

Other illustrative embodiments include, without limitation, apparatus, systems, methods and computer program products comprising processor-readable storage media.

BRIEF DESCRIPTION OF THE DRAWINGS

FIG. 1 illustrates an exemplary implementation of a high probability group (HPG)-based facial recognition system, according to one embodiment of the disclosure;

FIG. 2 illustrates exemplary pseudo code for processing a new image frame using the HPG-based facial recognition techniques, according to an embodiment;

FIG. 6 illustrates exemplary pseudo code for a related person network generation process, according to one embodiment of the disclosure;

DETAILED DESCRIPTION

Figure 3:
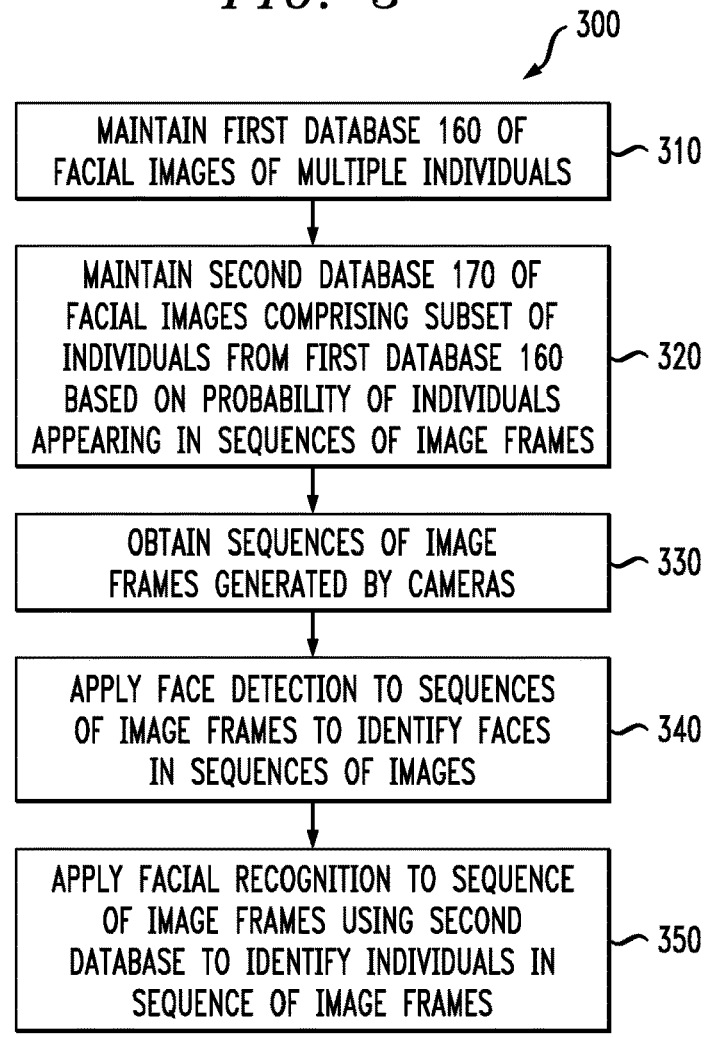
FIG. 3 is a flow chart illustrating an exemplary implementation of an HPG-based facial recognition process, according to some embodiments.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for HPG-based facial recognition techniques.

In one or more embodiments, facial recognition techniques are provided that address the above-described challenges for multi-stream videos by generating a set of persons, referred to herein as a high probability group stored in an HPG database, that are likely to appear in the video at the relevant time. The HPG set may be queried using a local cloud or a device at the edge of the Internet. In addition, the HPG database may bring some additional benefits, such as a better recognition of angles that were not previously seen. The disclosed HPG-based facial recognition techniques are agnostic to the particular face detection algorithm employed and the basic recognition algorithm and could complement such algorithms used now or in the future.

One or more embodiments of the disclosure recognize that a video is a sequence of image frames where each frame is usually similar to prior frames. Thus, for each face in a new frame, there is a good likelihood that the face has already appeared in prior frames. In addition, multi-stream videos often come from cameras that are geographically close (such as from the same office, floor, building or campus). Thus, persons that appear in images from one camera are also likely to appear in images from another camera. Further, different cameras produce face images from different angles. Thus, collecting facial images different angles will often result in better recognition.

The disclosed HPG-based facial recognition techniques use tracking technology to follow a face over time. In some embodiments, any available tracking algorithm may be employed, provided that it offers sufficient accuracy. In general, face tracking works by comparing close regions in a frame and one or more prior frames. Typically, tracking works by comparing a known area (e.g., a rectangle around the face) of the prior frame to the same rectangle in a current frame. If the similarity between the images inside the rectangles is sufficient, the images are classified as the same face. Thus, if the similarity between the frames satisfies a predefined similarity criterion, then the same face is assumed as long as the time difference between the frames is small enough.

Facial recognition currently typically works quite well, for example, when trying to recognize faces offline on the cloud. Doing facial recognition in real-time, however, for example, at the edge of the Internet (or close to the edge), may exhibit challenges of connectivity latency with the cloud, and/or computational power for non-cloud machines. Thus, it is often beneficial to develop a facial recognition solution that can execute with minimal resources at the edge of the Internet (or close to the edge).

A solution that relies on software that runs on the cloud, for example, will encounter times when the cloud is not available, or the connectivity with the cloud is too slow for real-time processing, which may be critical for some security applications. In addition, when the database of faces is very large, it is highly time-consuming to evaluate the entire database for each new image frame. Further, the facial database stores vectors of faces that were generated from images of faces with some specific angle. The camera in real-time, on-site may capture a face in some previously unseen angle that may result in a low recognition rate.

As noted above, the disclosed HPG-based facial recognition techniques address the challenges mentioned above for multi-stream videos by generating the HPG, comprising a set of persons that are likely to appear in the video at the relevant time, and using the HPG for real-time facial recognition.

In general, the disclosed HPG database (e.g., "shared" by multiple video streams in some embodiments) is used to evaluate, for each new image frame, whether a new facial image belongs to a face that has already been tracked (tracking typically works for each stream individually). If the new facial image belongs to a face that has already been tracked, then the facial image is assigned to the tracked face. If, however, the new facial image does not belong to a face that has already been tracked, then the facial image is checked against faces already found in the HPG database; if the new facial image is sufficiently close to a face in the HPG database, then the facial image is assigned to the face in the HPG database (and this face will now be tracked). If the new facial image is not sufficiently close to any of the faces found in the HPG database, then a new face identifier is generated and the new facial image is added to the HPG database (and this face will now be tracked).

Among other benefits, the disclosed multi-stream HPG-based facial recognition techniques collect images of the same person from multiple video appearances over time, to reduce error rates by having additional examples of the face of the person.

Once a sufficient number of images of a face of a new person in the HPG database are available, the images can optionally be matched to a larger database of known faces to obtain the name of the person (and/or obtain their status, such as employee/not an employee). This operation is optionally conducted in parallel with the face detection and HPG matching.

If a given HPG becomes too large, faces can be removed, using a maintenance process, as discussed further below in conjunction with FIG. 4, that did not appear in an image for a predefined and/or configurable amount of time (for example, by remembering, for each face in the HPG database, a last time stamp of appearance). In one implementation, the history window from which the HPG will be composed can be optimized for each time of day, by learning, for each time of day (e.g., for a given time window, such as a range of hours, morning and afternoon) the best time window (e.g., a threshold on the last time stamp of appearance) to use.

As noted above, one or more embodiments of the disclosure recognize that a video is a sequence of image frames where each frame is usually similar to prior frames. Thus, for each face in a new frame, there is a good chance that the face has already appeared in prior frames. In addition, multi-stream videos often come from cameras that are geographically close (such as from the same office, floor, building or campus). Thus, persons that appear in images from one camera are also likely to appear in images from another camera. Further, different cameras produce face images from different angles. Thus, collecting facial images from different angles will often result in better recognition.

FIG. 1 illustrates an exemplary implementation of an HPG-based facial recognition system 100, according to one embodiment of the disclosure. As shown in FIG. 1, the exemplary HPG-based facial recognition system 100 obtains video images from a plurality of cameras, such as cameras 110-1 through 110-N. Generally, each camera 110 streams its image data to a computing device, such as a (local) cloud device or an edge device.

As shown in FIG. 1, the multiple images are received by a camera collector 120, that generates video frames 130 for further digestion by the HPG-based facial recognition system 100. In one or more embodiments, the camera collector 120 optionally provides an application programming interface (API) that connects to the cameras 110 and returns image frames to be digested by the downstream algorithms.

A face detection and tracking module 140 is applied to the video frames to detect the region of interest (ROI) of the images and isolate one or more faces 145 from the video frames. In some embodiments, face detection and tracking module 140 executes a specialized algorithm (for example, a Multi-task Cascaded Convolutional Networks (MTCNN)) on each frame to discover ROIs (e.g., those regions where faces are located). For an optional optimization, the face detection module 140 optionally first determines if the face is already tracked (looking for high correlation near the last place of the face).

An HPG-based facial recognition module 150 is applied, using the face database 160 (e.g., the large database of faces described above; also referred to as a database of known faces (DKF)), and the disclosed HPG database 170, as discussed further below in conjunction with FIGS. 2 and 3. Generally, the HPG-based facial recognition module 150 compares a face from processed images to faces in the HPG database 170. If the face is already tracked, then the face is in the HPG database 170 (or it will be checked against the HPG database 170, when enough images of the face are available). If the new face is not previously tracked or known, then images of the face are tracked and collected and a new face identifier is generated for the face (the HPG database 170 optionally serves as a "cache" or local database that collects images of the same face). The faces of the HPG database 170 that were not yet recognized by name are optionally matched to the face database 160 to obtain a name for the face. In some embodiments, the multi-stream system can be employed for faster recognition, since it needs to be done once for the HPG database 170, instead of tracking each session in each camera.

In some embodiments, the HPG database 170 can reside in any device from the edge of the Internet to a local cloud, including, for example, a local memory, a cache, an edge device, a cloud device and an Internet device.

As discussed further below in conjunction with FIG. 5, the HPG database 170 optionally includes a facial network of related persons 500. Generally, the optional facial network of related persons 500 augments the HPG database 170 with a network of related persons obtained by learning which faces often appear in the same image frame or in image frames that are close in time. In this manner, the facial network of related persons 500 augments the HPG database 170 with additional potentially relevant faces. Thus, when a first person is identified in the image frames, the HPG database 170 can be augmented with additional facial images of people that are related to the first person (e.g., using one or more predefined related person criteria) who was identified in one or more image frames.

Thus, one or more aspects of the disclosure recognize that people often travel in small groups (e.g., friends and/or co-workers). These small groups may appear many times during a day, week, and/or month. Therefore, the appearance of one individual may suggest that one or more related persons may also appear in the images. Thus, these related persons are good candidates for the facial network of related persons 500. In addition, some persons may by "coupled," even if not traveling in a small group. For example, a mailman, delivery worker and office manager may be expected to appear in images with one another or with other identified individuals. Likewise, people who have regular meetings with one another, but who are not typically found together outside the meetings, may nonetheless be good candidates for the facial network of related persons 500.

FIG. 2 illustrates exemplary pseudo code 200 for processing a new image frame using the HPG-based facial recognition techniques, according to an embodiment of the disclosure. As shown in FIG. 2, for each new image frame, the following decision flow is employed:
  If the new facial image belongs to an already tracked face (tracking optionally works for each stream individually), the new facial image is assigned to the tracked face;
  If the new facial image is not tracked, the new facial image is checked against faces already found in the HPG database 170, and if the new facial image is sufficiently close to an HPG face in the HPG database 170, then the new facial image is assigned to the HPG face and tracking commences;
  If the new facial image is not sufficiently close to any HPG face in the HPG database 170, generate a new face identifier, start tracking the new facial image, and add the new face identifier to the HPG database 170;
  Collect images of the same person from multiple video appearances to reduce error rates by having more examples of the face of the person;
  Collect a sufficient number of images of a face of a new identifier in the HPG database 170, and then match the person to the face database 160 of known faces to obtain the name (and/or status like employee/not an employee) of the person (this operation is optionally conducted in parallel with face detection and HPG matching); and
  Optionally, import persons related to tracked face into facial network of related persons 500 within HPG database 170 from face database 160.

FIG. 3 is a flow chart illustrating an exemplary implementation of an HPG-based facial recognition process 300, according to some embodiments. As shown in FIG. 3, the exemplary HPG-based facial recognition process 300 initially maintains a first database 160 of facial images of multiple individuals during step 310. During step 320, the exemplary HPG-based facial recognition process 300 maintains a second database 170 of facial images comprising a subset of individuals from the first database 160. The subset is obtained based on a probability of individuals appearing in the sequences of image frames at a given time.

A sequence of image frames generated by the cameras 110 is obtained during step 330, and face detection is applied to the sequence of image frames during step 340 to identify faces in the sequences of images. Finally, during step 350, the exemplary HPG-based facial recognition process 300 applies facial recognition to at least one sequence of image frames using the second database 170 to identify individuals in the sequence of image frames.

Figure 4:
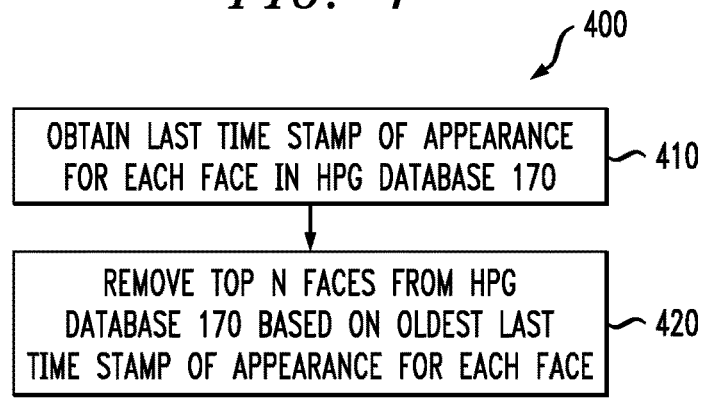
FIG. 4 is a flow chart illustrating an exemplary implementation of an HPG maintenance process, according to one embodiment of the disclosure.

FIG. 4 is a flow chart illustrating an exemplary implementation of an HPG maintenance process 400, according to one embodiment of the disclosure. As shown in FIG. 4, the exemplary HPG maintenance process 400 obtains a last time stamp of appearance for each face in the HPG database 170 during step 410. Thereafter, the exemplary HPG maintenance process 400 removes, during step 420, the top N faces (where N is predefined or configurable) from the HPG database 170 based on an oldest last time stamp of appearance for each face. The relative last time stamp can be learned, for example, by running performance experiments, to substantially minimize the average running time.

In a further variation, the composition of the HPG database 170 is optionally further optimized for the time of day, such as for each hour, or range of hours (e.g., mornings). For example, the probability of individuals appearing in one or more sequences of image frames can only consider a specified time range, to consider only a subset of the HPG database 170 that is likely to appear in the image frames during the specified time range (e.g., by using a different history window (last relative time stamp) from which the filtered HPG database 170 will be composed). The history window is optionally learned as before by performance experiments, that will try to minimize the average running time.

Figure 5:
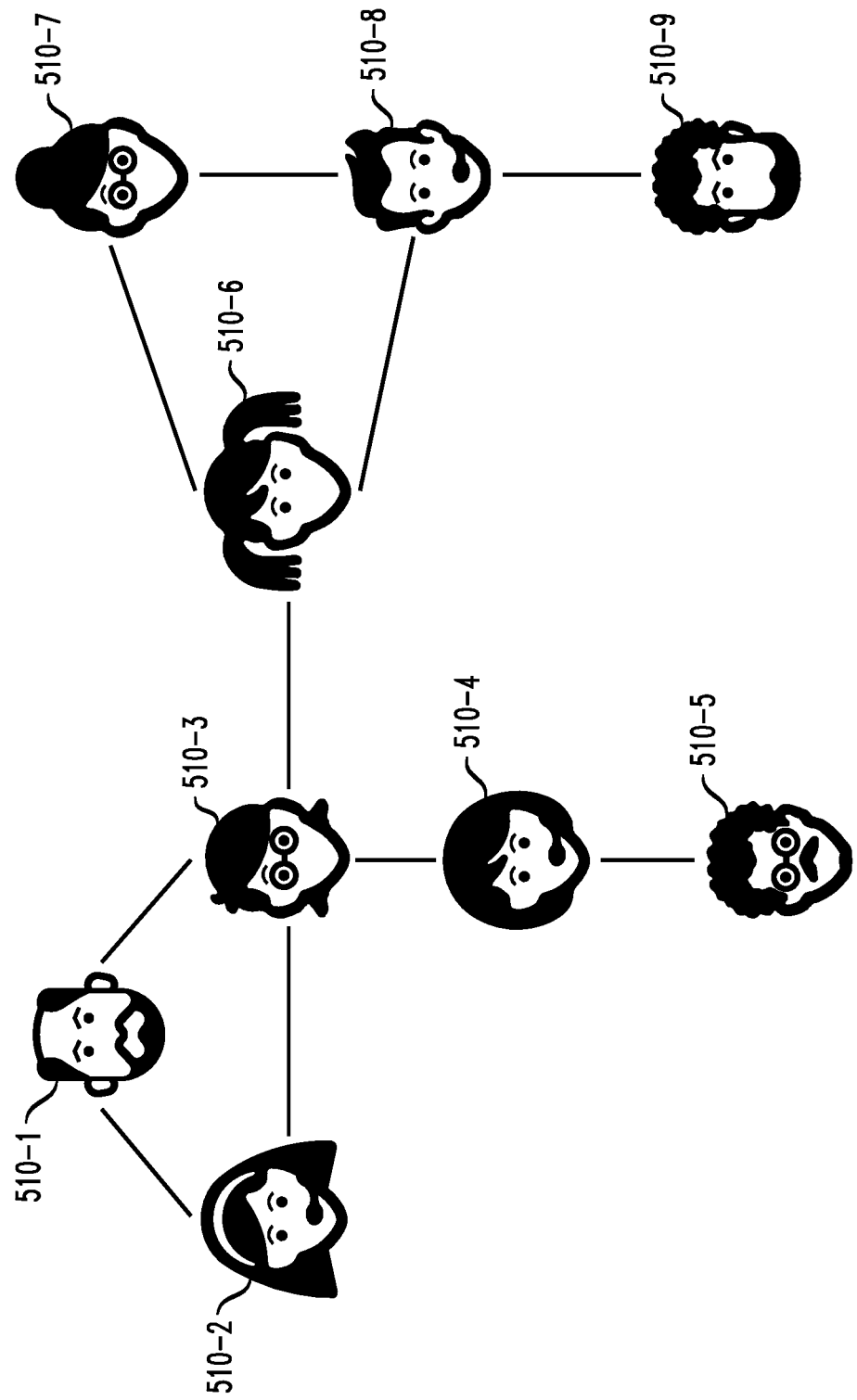
FIG. 5 illustrates the optional facial network of related persons of FIG. 1 in further detail, according to some embodiments.

FIG. 5 illustrates the facial network of related persons 500 of FIG. 1 in further detail, according to some embodiments. The facial network of related persons 500, in some embodiments comprise facial identifiers, such as, for example, facial identifiers 510-1 through 510-9. As noted above, if a face was matched, any persons related to the matched face are optionally imported from the face database 160, into the facial network of related persons 500 within the HPG database 170.

For example, if the facial image associated with facial identifier 510-3 was just recognized in one or more image sequences, there is a likelihood that faces associated with facial identifiers 510-1, 510-2, 510-4, and 510-6 from the facial network of the face with facial identifier 510-3 will also appear in the same image frame or an image frame that is substantially close in time. Therefore, if the faces associated with facial identifiers 510-1, 510-2, 510-4, and 510-6 are not already in the HPG database 170, they are imported from the face database 160. Importing is done, for example, by generating a new facial identifier in the HPG database 170 using images (e.g., n-dimensional vectors) found in the face database 160.

The HPG database 170 itself is optionally used to learn (or unlearn) and improve the facial network of related persons 500. As noted above, in some embodiments, each face in the HPG database 170 has timestamps for their appearances in image frames. Using these timestamps, those persons that are often found close to one another can be learned, even if the video frame comes from different cameras. If, for some reason, two "related" people stop appearing in the same image frame or in an image frames that are close in time, then the related status of these two people can be disconnected after a time period.

FIG. 6 illustrates exemplary pseudo code exemplary user authentication process 600 for a related person network generation process, according to one embodiment of the disclosure. As shown in FIG. 6, the facial network of related persons 500 is generated as follows, for example, as a undirected graph:

For each person in the HPG database 170, evaluate its time series of appearance timestamps and cluster appearance timestamps into scenes (the output is a time series of scenes where each scene is a time interval with minimum and maximum);

Evaluate all faces in the HPG database 170, for each two faces, $f_1$ and $f_2$, go over all scenes of $f_1$ and find the closest scene in to scenes of $f_2$. If the scenes overlap, then the difference is zero. If there are enough overlapping scenes (e.g., based on a predefined or configured threshold that can be found and optimized empirically) or enough scenes with a small-time difference (e.g., based on a predefined or configured threshold that can be found and optimized empirically), then connect nodes of the two faces, $f_1$ and $f_2$, with an edge; and For each edge, obtain a weight for the number of times the persons were seen in images that are close in time or together. For each new computation of the network 500, the old weight will be degraded by a factor so that connections that are not valid any more will be removed over time.

Among other benefits, the disclosed HPG-based facial recognition techniques improve the scalability of face recognition in multi-stream videos. For example, the disclosed facial recognition techniques substantially reduce the number of searches that must be performed above against the large face database 160, by performing a large number of the searches against the smaller HPG database 170 (optionally, enhanced with the facial network of related persons 500) and then searching a collection of images from the HPG database 170 against the larger face database 160. In addition, by reducing the intensiveness of the required searching, the disclosed HPG-based facial recognition techniques can be implemented on computing devices with lower resources, such as those devices commonly found close or on the edge of the Internet.

In some embodiments, the disclosed HPG-based facial recognition techniques use more images of the person to recognize their identity, relative to conventional techniques. One or more aspects of the disclosure recognize that it is often "easier" to identify the person in video images captured close in time to the matching, than to match the face to a set of images captured a longer time ago. Further, by collecting several images of the same face, especially from different angles obtained from multiple image streams, the facial recognition performance and accuracy is further improved.

One or more embodiments of the disclosure provide improved methods, apparatus and computer program products for HPG-based facial recognition techniques. The foregoing applications and associated embodiments should be considered as illustrative only, and numerous other embodiments can be configured using the techniques disclosed herein, in a wide variety of different applications.

It should also be understood that the disclosed HPG-based facial recognition techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed facial recognition techniques may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform-as-a-Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based facial recognition engine 200, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based facial recognition platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. These platforms may also be used to implement at least portions of other information processing systems in other embodiments.

Figure 7:
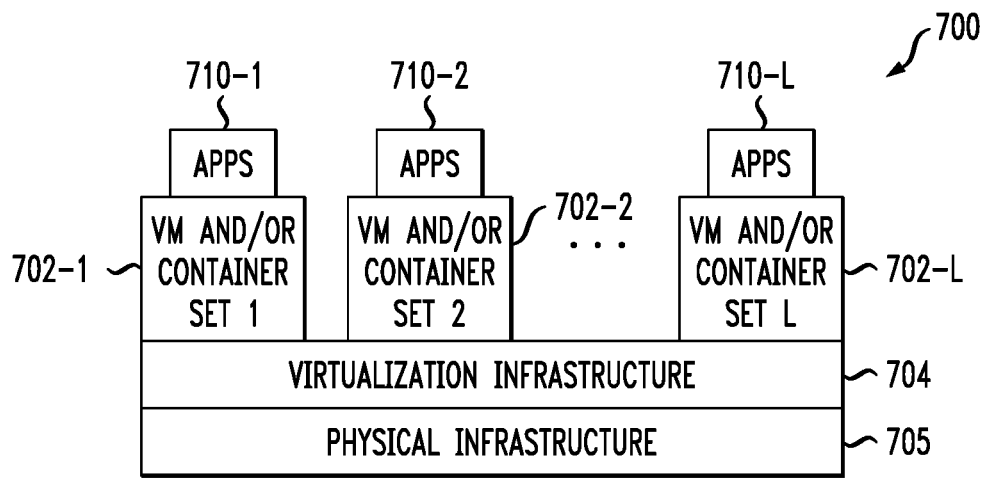
FIG. 7 illustrates an exemplary processing platform that may be used to implement at least a portion of one or more embodiments of the disclosure comprising a cloud infrastructure.

FIG. 7 shows an example processing platform comprising cloud infrastructure 700. The cloud infrastructure 700 comprises a combination of physical and virtual processing resources that may be utilized to implement at least a portion of an information processing system. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. Such implementations can provide facial recognition functionality of the type described above for one or more processes running on a given one of the VMs. For example, each of the VMs can implement facial recognition control logic and HPG database 170 for providing HPG-based facial recognition functionality for one or more processes running on that particular VM.

An example of a hypervisor platform that may be used to implement a hypervisor within the virtualization infrastructure 704 is the VMware® vSphere® which may have an associated virtual infrastructure management system such as the VMware® vCenter™. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system. Such implementations can provide facial recognition functionality of the type described above for one or more processes running on different ones of the containers. For example, a container host device supporting multiple containers of one or more container sets can implement one or more instances of facial recognition control logic and associated HPG database 170 for use in HPG-based facial recognition.

As is apparent from the above, one or more of the processing modules or other components of HPG-based facial recognition system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises at least a portion of the given system and includes a plurality of processing devices, denoted 802-1, 802-2, 802-3, . . . 802-K, which communicate with one another over a network 804. The network 804 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 802-1 in the processing platform 800 comprises a processor 810 coupled to a memory 812. The processor 810 may comprise a microprocessor, a microcontroller, an application specific integrated circuit (ASIC), a field programmable gate array (FPGA) or other type of processing circuitry, as well as portions or combinations of such circuitry elements, and the memory 812, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and the given system may include additional or alternative processing platforms, as well as numerous distinct processing platforms in any combination, with each such platform comprising one or more computers, storage devices or other processing devices.

Figure 8:
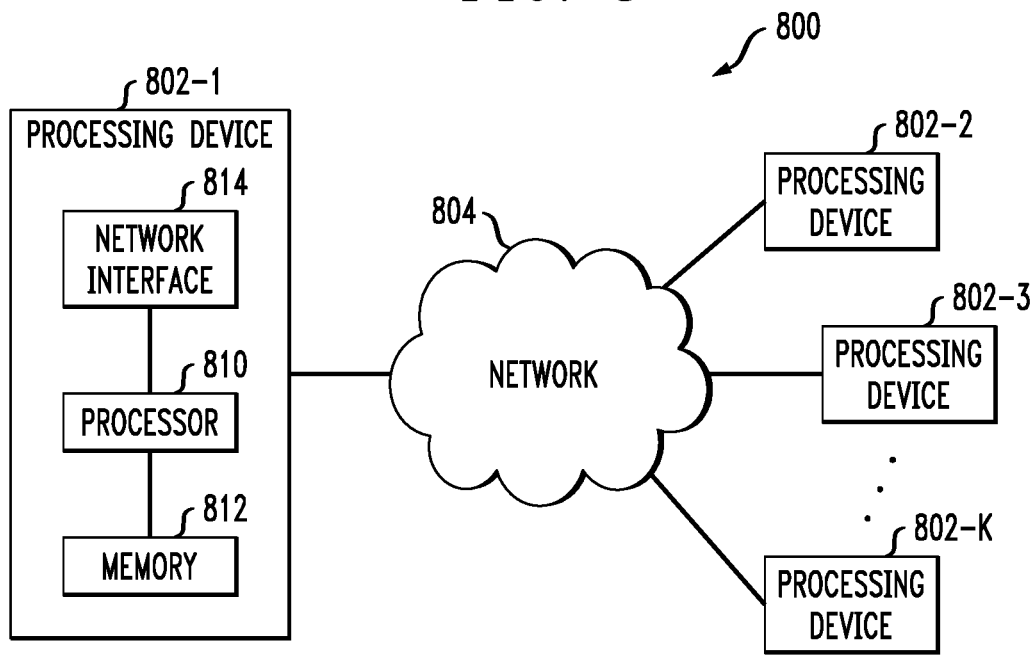
FIG. 8 illustrates another exemplary processing platform that may be used to implement at least a portion of one or more embodiments of the disclosure.

Multiple elements of an information processing system may be collectively implemented on a common processing platform of the type shown in FIG. 7 or 8, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
   maintaining a probability-based database of facial images comprising a subset of individuals from a first database of facial images of a plurality of individuals, wherein the subset is obtained based on a probability of individuals appearing in one or more sequences of image frames at a given time;
   applying a face detection algorithm to at least one of the sequences of image frames to identify one or more faces in the one or more sequences of image frames;
   maintaining a facial network of related persons associated with the probability-based database by obtaining one or more facial images of one or more additional individuals from the first database of images that satisfy one or more predefined related person criteria with respect to one or more individuals identified in at least one of the sequences of image frames, wherein the one or more facial images of the one or more additional individuals from the first database of images are obtained based on at least one of: a network size of the facial network and a number of edges of the facial network; and
   applying facial recognition to at least one of the sequences of image frames using at least the probability-based database and the facial network of related persons to identify one or more individuals in the at least one sequence of image frames,
   wherein the method is performed by at least one processing device comprising a processor coupled to a memory.

2. The method of claim 1, wherein the one or more facial images of the one or more additional individuals from the first database of images are obtained further based on a community name.

3. The method of claim 1, wherein the probability-based database of facial images is comprised of facial images of one or more individuals that appeared in one or more prior image frames and is stored in one or more of a local memory, a cache, an edge device, a cloud device and an Internet device.

4. The method of claim 1, wherein a new image frame is processed to associate a face in the new image frame with a face that has previously been tracked if a facial image in the new image frame satisfies a predefined similarity metric with respect to the face that has previously been tracked.

5. The method of claim 1, wherein a new image frame is processed to assign a name to a facial image in the new image frame if the facial image satisfies a predefined similarity metric with a given face in the probability-based database.

6. The method of claim 1, wherein a new image frame is processed to add a facial image in the new image frame to the probability-based database if the facial image does not satisfy a predefined similarity metric with a given face in the probability-based database.

7. The method of claim 1, further comprising the step of matching one or more images of a face of an unnamed person in the probability-based database to images of known faces in the first database to obtain a name of the unnamed person.

8. A computer program product, comprising a non-transitory machine-readable storage medium having encoded therein executable code of one or more software programs, wherein the one or more software programs when executed by at least one processing device perform the following steps:
   maintaining a probability-based database of facial images comprising a subset of individuals from a first database of facial images of a plurality of individuals, wherein the subset is obtained based on a probability of individuals appearing in one or more sequences of image frames at a given time;
   applying a face detection algorithm to at least one of the sequences of image frames to identify one or more faces in the one or more sequences of image frames;
   maintaining a facial network of related persons associated with the probability-based database by obtaining one or more facial images of one or more additional individuals from the first database of images that satisfy one or more predefined related person criteria with respect to one or more individuals identified in at least one of the sequences of image frames, wherein the one or more facial images of the one or more additional individuals from the first database of images are obtained based on at least one of: a network size of the facial network and a number of edges of the facial network; and applying facial recognition to at least one of the sequences of image frames using at least the probability-based database and the facial network of related persons to identify one or more individuals in the at least one sequence of image frames.

9. The computer program product of claim 8, wherein the one or more facial images of the one or more additional individuals from the first database of images are obtained further based on a community name.

10. The computer program product of claim 8, wherein a new image frame is processed to associate a face in the new image frame with a face that has previously been tracked if a facial image in the new image frame satisfies a predefined similarity metric with respect to the face that has previously been tracked.

11. The computer program product of claim 8, wherein a new image frame is processed to assign a name to a facial image in the new image frame if the facial image satisfies a predefined similarity metric with a given face in the probability-based database.

12. The computer program product of claim 8, wherein a new image frame is processed to add a facial image in the new image frame to the probability-based database if the facial image does not satisfy a predefined similarity metric with a given face in the probability-based database.

13. An apparatus, comprising:
a memory; and
at least one processing device, coupled to the memory, operative to implement the following steps:
maintaining a probability-based database of facial images comprising a subset of individuals from a first database of facial images of a plurality of individuals, wherein the subset is obtained based on a probability of individuals appearing in one or more sequences of image frames at a given time;
applying a face detection algorithm to at least one of the sequences of image frames to identify one or more faces in the one or more sequences of image frames;
maintaining a facial network of related persons associated with the probability-based database by obtaining one or more facial images of one or more additional individuals from the first database of images that satisfy one or more predefined related person criteria with respect to one or more individuals identified in at least one of the sequences of image frames, wherein the one or more facial images of the one or more additional individuals from the first database of images are obtained based on at least one of: a network size of the facial network and a number of edges of the facial network; and
applying facial recognition to at least one of the sequences of image frames using at least the probability-based database and the facial network of related persons to identify one or more individuals in the at least one sequence of image frames.

14. The apparatus of claim 13, wherein the one or more facial images of the one or more additional individuals from the first database of images are obtained further based on a community name.

15. The apparatus of claim 13, wherein a new image frame is processed to associate a face in the new image frame with a face that has previously been tracked if a facial image in the new image frame satisfies a predefined similarity metric with respect to the face that has previously been tracked.

16. The apparatus of claim 13, wherein a new image frame is processed to assign a name to a facial image in the new image frame if the facial image satisfies a predefined similarity metric with a given face in the probability-based database.

17. The apparatus of claim 13, wherein a new image frame is processed to add a facial image in the new image frame to the probability-based database if the facial image does not satisfy a predefined similarity metric with a given face in the probability-based database.

18. The apparatus of claim 13, wherein the probability-based database of facial images is comprised of facial images of one or more individuals that appeared in one or more prior image frames and is stored in one or more of a local memory, a cache, an edge device, a cloud device and an Internet device.

19. The apparatus of claim 13, further comprising the step of matching one or more images of a face of an unnamed person in the probability-based database to images of known faces in the first database to obtain a name of the unnamed person.

20. The computer program product of claim 8, further comprising the step of matching one or more images of a face of an unnamed person in the probability-based database to images of known faces in the first database to obtain a name of the unnamed person.

* * * * *